(12) United States Patent
Wilson et al.

(10) Patent No.: US 7,436,757 B1
(45) Date of Patent: Oct. 14, 2008

(54) SCATTERED PILOT AND FILTERING FOR CHANNEL ESTIMATION

(75) Inventors: Keith S Wilson, Bishop's Stortford (GB); D. Damian N. Bevan, Bishop's Stortford (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1094 days.

(21) Appl. No.: 10/177,009

(22) Filed: Jun. 21, 2002

(51) Int. Cl.
*H04J 11/00* (2006.01)
(52) U.S. Cl. .................................... 370/203; 455/562.1
(58) Field of Classification Search ................. 370/203; 455/562.1
See application file for complete search history.

(56) References Cited

U.S. PATENT DOCUMENTS

| | | | |
|---|---|---|---|
| 6,654,429 B1 * | 11/2003 | Li ............................... | 375/316 |
| 6,760,388 B2 * | 7/2004 | Ketchum et al. ............ | 375/295 |
| 7,006,848 B2 * | 2/2006 | Ling et al. ................ | 455/562.1 |
| 7,092,436 B2 * | 8/2006 | Ma et al. ..................... | 375/229 |
| 2002/0181390 A1 * | 12/2002 | Mody et al. ................. | 370/208 |
| 2003/0007553 A1 * | 1/2003 | Fifield ......................... | 375/232 |
| 2003/0072254 A1 * | 4/2003 | Ma et al. ..................... | 370/208 |

* cited by examiner

*Primary Examiner*—Firmin Backer
*Assistant Examiner*—Toan D Nguyen
(74) *Attorney, Agent, or Firm*—Barnes & Thornburg LLP

(57) ABSTRACT

Methods of improving channel estimation are described, in which pilot symbols are inserted into orthogonal frequency division multiplexing (OFDM) frames at an OFDM transmitter having at least one transmitting antenna, wherein for the or each antenna, historical data regarding channel conditions is obtained so that the scattered pilot symbols are inserted in a scattered pattern dependent upon said historical data. Alternatively, or in addition, an adaptive channel estimation filter is used whose parameters are selected according to analysis of historical data regarding channel conditions.

19 Claims, 5 Drawing Sheets

SCATTERED PILOT AND FILTERING FOR CHANNEL ESTIMATION

FIELD OF THE INVENTION

This invention relates to an orthogonal frequency division multiplexing (OFDM) communication systems, and more particularly to a more efficient use of pilot symbols within such systems.

BACKGROUND TO THE INVENTION

Multiple Input Multiple Output-Orthogonal Frequency Division Multiplexing (MIMO-OFDM) is a highly spectral efficient technology used to transmit high-speed data through radio channels with fast fading both in frequency and in time.

In wireless communication systems that employ OFDM, a transmitter transmits data to a receiver using many sub-carriers in parallel. The frequencies of the sub-carriers are orthogonal. Transmitting the data in parallel allows the symbols containing the data to be of longer duration, which mitigates the effects of multi-path fading in particular dispersion. The orthogonality of the frequencies allows the sub-carriers to be tightly spaced, while minimising inter-carrier interference. At the transmitter, the data is encoded, interleaved, and modulated to form data symbols. Overhead information is added, including pilot symbols, and the symbols (data plus overhead) are organised into OFDM symbols. Each OFDM symbol typically uses $2^n$ frequencies.

Each symbol is allocated to represent a component of a different orthogonal frequency. An inverse Fast Fourier Transform (IFFT) is applied to the OFDM symbol (hence the preference of $2^n$ frequencies) to generate time samples of a signal. Cyclic extensions are added to the signal, and the signal is passed through a digital-to-analog converter. Finally, the transmitter transmits the signal to the receiver along a channel.

When the receiver receives the signal, the inverse operations are performed. The received signal is passed through an analog-to-digital converter, and timing information is then determined. The cyclic extensions are removed from the signal. The receiver performs a FFT on the received signal to recover the frequency components of the signal, that is, the data symbols. Error correction may be applied to the data symbols to compensate for variations in phase and amplitude caused during propagation of the signal along the channel. The data symbols are then demodulated, de-interleaved, and decoded, to yield the transmitted data.

In systems employing differential detection, the receiver compares the phase and/or amplitude of each received symbol with an adjacent symbol. The adjacent symbol may be adjacent in the time direction or in the frequency direction. The receiver recovers the transmitted data by measuring the change in phase and/or amplitude between a symbol and the adjacent symbol. If differential detection is used, channel compensation need not be applied to compensate for variations in phase and amplitude caused during propagation of the signal. However, in systems employing coherent detection the receiver must estimate the actual phase and amplitude of the channel response, and channel compensation must be applied.

The variations in phase and amplitude resulting from propagation along the channel are referred to as the channel response. The channel response is usually frequency and time dependent. If the receiver can determine the channel response, the received signal can be corrected to compensate for the channel degradation. The determination of the channel response is called channel estimation. The inclusion of pilot symbols in each OFDM symbol allows the receiver to carry out channel estimation. The pilot symbols are transmitted with a value known to the receiver. When the receiver receives the OFDM symbol, the receiver compares the received value of the pilot symbols with the known transmitted value of the pilot symbols to estimate the channel response.

The pilot symbols are overhead, and should be as few in number as possible in order to maximise the transmission rate of data symbols. Since the channel response can vary with time and with frequency, the pilot symbols are scattered amongst the data symbols to provide as complete a range as possible of channel response over time and frequency. The set of frequencies and times at which pilot symbols are inserted is referred to as a pilot pattern. The optimal temporal spacing between the pilot symbols is usually dictated by the maximum anticipated Doppler frequency, and the optimal frequency spacing between the pilot symbols is usually dictated by the anticipated delay spread of multi-path fading.

The existing pilot-assisted OFDM channel estimation approaches are designed for conventional one transmitter systems. With a scattered pilot arrangement, there are three classes of algorithms:

1-D frequency interpolation or time interpolation
Transformed frequency 1-D interpolation
Independent time and frequency 1-D interpolation The first class of algorithms is based on the pilot OFDM symbol (all of the sub-carriers are used as the pilots) or comb-type of pilots. This approach, shown in the flow chart of FIG. 1A, is simple but only suitable for channels with high frequency selectivity or channels with high time fading. The method involves pilot extraction in the frequency domain (step 1A-1) followed by interpolation in time (step 1A-2), or interpolation in frequency (step 1A-3).

The second method shown in the flow chart of FIG. 1B is aimed for channels with slow Doppler fading and fast frequency fading. It improves the first method by using a FFT to reconstruct the channel response back to time domain for noise reduction processing at the expense of FFT/IFFT computing for the channel estimation separately. The method begins with pilot extraction in the frequency domain (step 1B-1), which may be followed by interpolation in frequency (step 1B-2). Then an inverse fast Fourier transform (step 1B-3), smoothing/de-noise processing (step 1B-4), and finally a fast Fourier transform (1B-5) steps are executed.

The third method shown in the flow chart of FIG. 1C can be used to estimate channel for mobile applications, where both fast time fading and frequency fading exist. However, it needs a relatively high density of pilots and a completed interpolator. This method involves pilot extraction in the frequency domain (step 1C-1) this is followed by interpolation in time (step 1C-2) and interpolation in frequency (step 1C-3).

In the propagation environment with both high time dispersion and rapid temporal fading, the channel estimation performance can be improved by the increase of pilot symbol density at the price of the reduction of the spectral efficiency of the data transmission. To interpolate and reconstruct the channel response function from the limited pilots to achieve reliable channel estimation with the minimum overhead is a challenging task.

There are a variety of existing standard pilot patterns. In environments in which the channel varies only slowly with time and frequency, the pilot symbols may be inserted cyclically, being inserted at an adjacent frequency after each time interval. In environments in which the channel is highly frequency dependent, the pilot symbols may be inserted periodically at all frequencies simultaneously. However, such a pilot pattern is only suitable for channels that vary very slowly with time. In environments in which the channel is highly time dependent, the pilot symbols may be inserted continuously at only specific frequencies in a comb arrangement to provide a constant measurement of the channel response. However, such a pilot pattern is only suitable for channels that vary slowly with frequency. In environments in which the channel is both highly frequency and highly time dependent (for example, mobile systems with much multi-path fading), the pilot symbols may be inserted periodically in time and in frequency so that the pilot symbols form a rectangular lattice when the symbols are depicted in a time-frequency diagram.

In OFDM communication systems employing coherent modulation and demodulation, the receiver must estimate the channel response at the frequencies of all sub-carriers and at all times. This requires more processing than in systems that employ differential modulation and demodulation. However a significant improvement in throughput at any given signal-to-noise ratio can be achieved using coherent modulation and demodulation (for a given error probability). The receiver determines the channel response at the times and frequencies at which pilot symbols are inserted into the OFDM symbol, and performs interpolations to estimate the channel response at the times and frequencies at which the data symbols are located within the OFDM symbol. Placing pilot symbols more closely together (in frequency if a comb pattern is used, in time if a periodic pattern is used, or in both frequency and in time if a rectangular lattice pattern is used) within a pilot pattern results in a more accurate interpolation. However, because pilot symbols constitute an overhead, a tighter pilot pattern comes at the expense of the useful transmitted data rate.

Existing pilot patterns and interpolation techniques are usually sufficient if the channel varies slowly with time (for example for nomadic applications). However, if the channel varies quickly with time (for example, for mobile applications), the time interval between pilot symbols must be reduced in order to allow an accurate estimation of the channel response through interpolation. This increases the overhead in the signal.

The problem of minimising the number of pilot symbols while maximising the accuracy of the interpolation is also particularly cumbersome in Multiple-Input Multiple-Output (MIMO) OFDM systems. In MIMO OFDM systems, the transmitter transmits data through more than one transmitting antenna and the receiver receives data through more than one receiving antenna. The binary data is usually divided between the transmitting antennas, although the same data may be transmitted through each transmitting antenna if spatial diversity is desired. Each receiving antenna receives data from all the transmitting antennas, so if there are M transmitting and N receiving antennas, then the signal will propagate over M×N channels, each of which has its own channel response. Each transmitting antenna inserts pilot symbols into the same sub-carrier location of the OFDM symbol which it is transmitting. In order to minimise interference at the receiver between the pilot symbols of each transmitting antenna, each transmitting antenna typically blinks its pilot pattern on and off. This increases the temporal separation of the pilot symbols for each transmitter, reducing the accuracy of the interpolation used to estimate the channel response.

In MIMO-OFDM systems a simple and fast channel estimation method is particularly crucial because of the limitation of the computational power for estimating M×N channels, while in SISO-OFDM systems (Single Input Single Output-OFDM) only one channel needs to be estimated.

In our co-pending U.S. patent application Ser. No. 10/038,883, there are described channel estimation methods which are based on the partial interpolation of a scattered pilot by using true 2D interpolation; and additionally, simple 1D interpolation used to reconstruct the entire channels. This method has a reduced scattered pilot overhead and is at least an order of magnitude less computationally complex than some existing methods.

Although the methods proposed in the above application provide better channel estimation than some existing methods, it is observed that the scattered pilot and receiver channel filter parameters are pre-set and optimised for some "average" channel condition. In practice it is very likely that the receiver will be in an environment that does not match this average situation in which case, the accuracy of the channel estimation is limited by these "average" settings, which may adversely affect downlink throughput to the receiver.

SUMMARY OF THE INVENTION

According to a first aspect of the present invention there is provided a method of inserting pilot symbols into orthogonal frequency division multiplexing (OFDM) frames at an OFDM transmitter having at least one transmitting antenna, each OFDM frame comprising a plurality of OFDM symbols, the method comprising the steps of:

for the or each antenna, obtaining historical data regarding channel conditions, and inserting scattered pilot symbols in a scattered pattern dependent upon said historical data. This enables the pilot symbol pattern to be dynamically varied according to the prevalent channel conditions thus improving channel estimation over time.

Preferably, wherein said historical data comprises one or more of: signal to noise plus interference ratio (SNIR), dispersion and/or temporal fading.

In a preferred form, the historical data is obtained from a receiver. Alternatively, the historical data is obtained by the antenna by observation of an uplink signal.

According to a second aspect of the invention, there is provided an OFDM transmitter comprising at least one transmit antenna, capable of receiving historical data regarding channel conditions, and inserting scattered pilot symbols in a scattered pattern dependent upon said historical data.

According to a third aspect of the invention there is provided an OFDM transmitter comprising at least one transmit antenna capable of receiving historical data regarding channel conditions, and inserting scattered pilot symbols in a scattered pattern dependent upon said historical data. This improves the accuracy of the channel estimation, since the scattered pilot parameters are selected according to prevalent channel conditions, rather than being preset and/or set to an "average" of expected channel conditions.

According to a fourth aspect of the invention there is provided an OFDM receiver comprising at least one receive antenna and an adaptive filter, whose size and shape can be varied to optimise channel estimation. Preferably, the adaptive filter comprises an infinitely adjustable filter. Alternatively, the adaptive filter comprises a filter selected from a specified set of filters.

According to a fifth aspect of the invention there is provided a system or network including an OFDM receiver as described above.

According to a sixth aspect of the invention there is provided an OFDM signal including pilot symbols, said pilot symbols being arranged in a pattern selected according to historical data regarding channel conditions.

According to a further aspect of the invention there is provided an adaptive channel estimation filter for use in an OFDM receiver, whose size and shape can be selected or varied to optimise channel estimation, according to historical data regarding channel conditions.

Further aspects of the invention include software for controlling an adaptive channel estimation filter as described above or for carrying out or implementing the above-described method steps. This acknowledges that software can be a valuable, separately tradable commodity. Such a system in the form of software is intended to encompass software which runs on or controls "dumb" or standard hardware to carry out the desired functions (and therefore the software essentially defines the functions of the system, even before it is combined with the relevant standard hardware). For similar reasons it is also intended to encompass software (such as HDL [hardware description language] software) which "describes" or defines the configuration of hardware and is used for designing silicon chips, or for configuring universal programmable chips, to carry out desired functions.

Further aspects of the invention include an improved data transmission service in which pilot symbols are inserted in a pattern dependent upon historical data regarding channel conditions and/or including use of an adaptive channel estimation filter whose size and shape can be selected or varied to optimise channel estimation, according to historical data regarding channel conditions. As the advantages of the invention can enable a better network which provides improved channel estimation, consequently a data transmission service over the network can show a corresponding improvement and the value of such services can increase. Such increased value over the life of the system could prove far greater than the sales value of the equipment.

A further aspect of the invention comprises a method of improving channel estimation in an orthogonal frequency division multiplexing (OFDM) communication system by signalling data between a receiver and a transmitter using a control channel, said data being used to optimise channel estimation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the present invention will now be more particularly described, by way of example only, with reference to the accompanying figures, in which.

DETAILED DESCRIPTION OF THE PREFERRED EMBODIMENTS

Figure 1A:
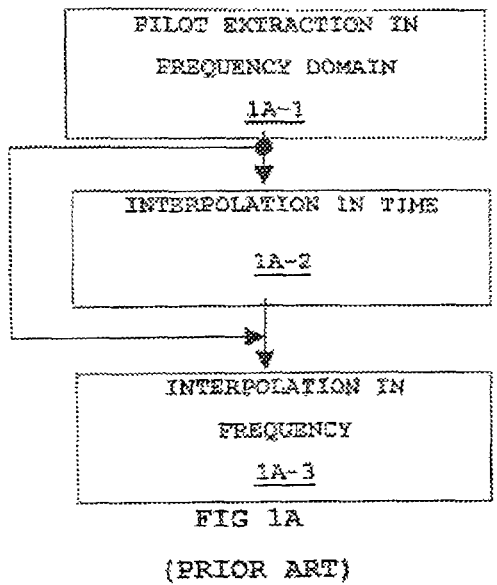
FIG. 1 illustrates flow charts for three examples of conventional OFDM channel estimation.
Figure 1B:
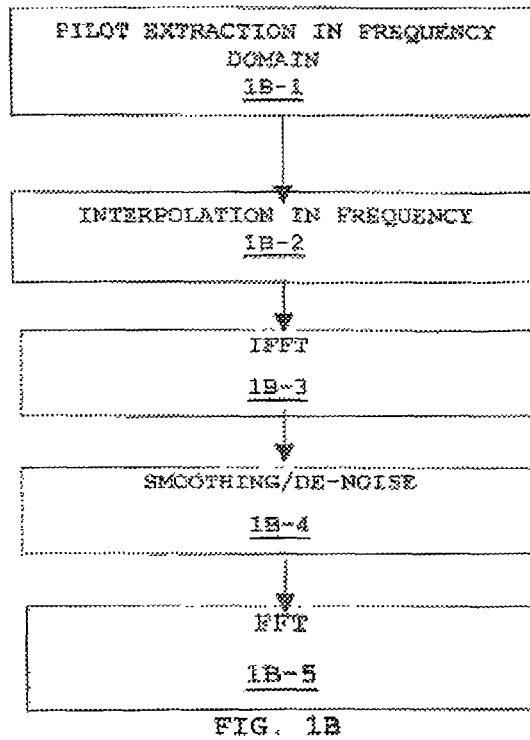
Figure 1C:
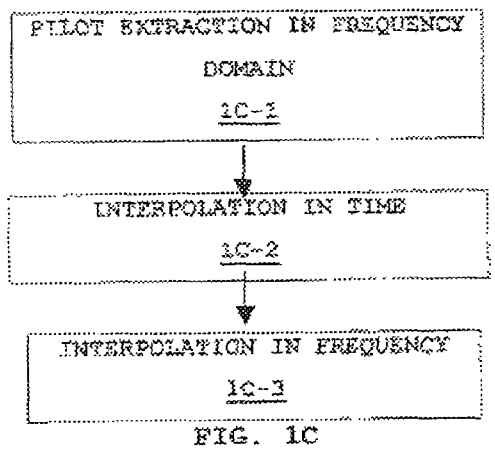
Figure 2:
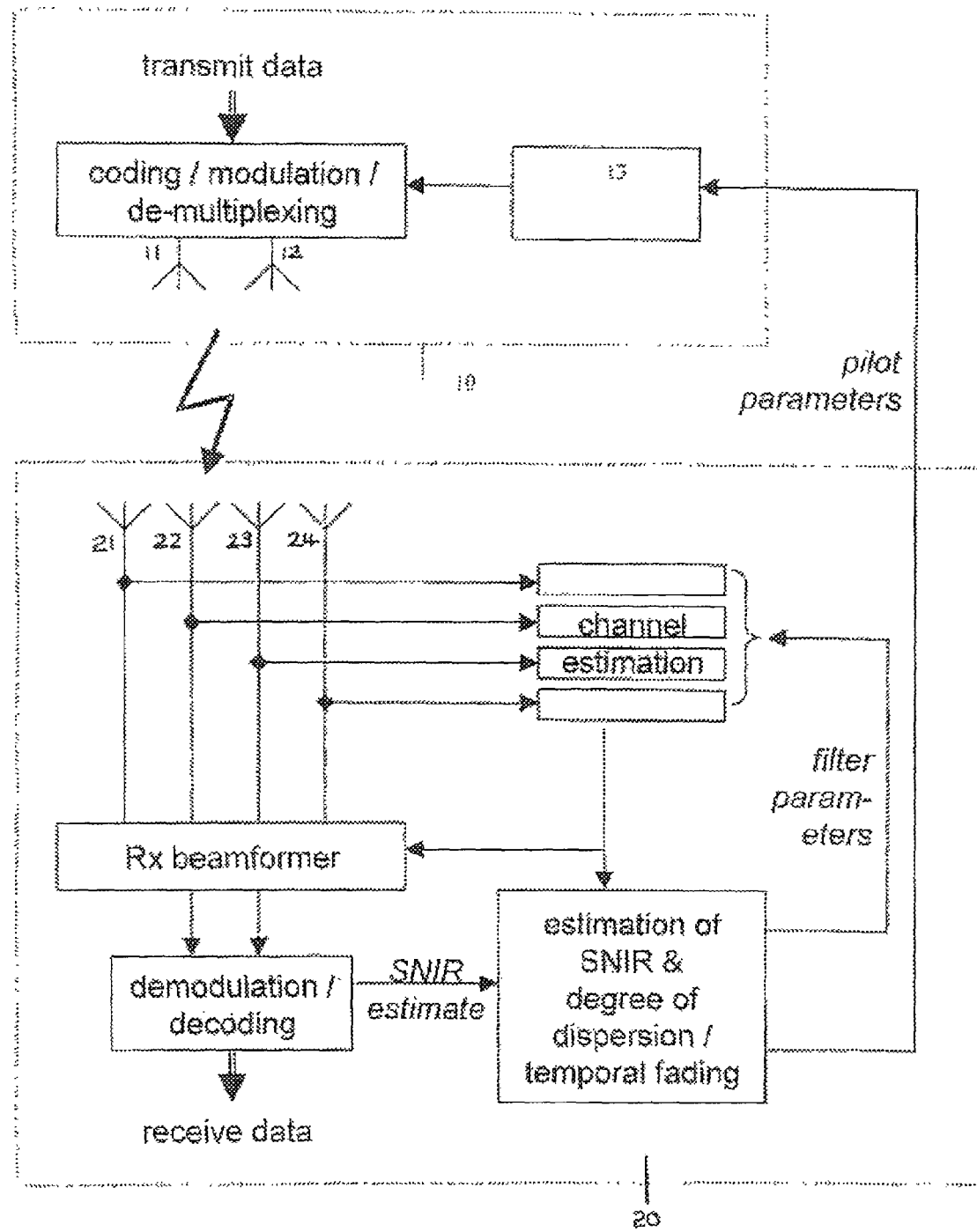
FIG. 2 shows an OFDM transmitter and receiver suitable for use in the present invention.

The system illustrated in FIG. 2 shows the downlink of a MIMO-OFDM system, wherein the base station 10 is transmitting data to a particular User Equipment (UE) 20. By way of example, a 2:4 MIMO scheme is shown—i.e. there are two transmit antennas 11, 12 at the base station 10, and four receive antennas 21, 22, 23, 24 at the UE 20. Data to be transmitted to the UE 20 is first coded and modulated, and then de-multiplexed onto the two transmit antennas 11, 12. This de-multiplexing stage can also be performed before the coding and modulation, if it is desirable to use, for example, a different modulation and coding scheme (MCS) on each transmitter.

In addition to the data, a scattered pilot is inserted by pilot insertion module 13, as shown in FIG. 2. This essentially involves the transmission of known pilot symbols at regular points in the OFDM frame, in both time and frequency, in order to allow the UE to determine the channel responses. A possible arrangement is given in FIG. 3 by way of example. The pilot symbols are in pairs, as they use differential space-time block coding (D-STBC) such that the pilot transmissions on each of the two transmitters 11, 12 are orthogonal, and can be separated at the receiver with minimal mutual interference. Further detail of this can be found in co-pending U.S. patent application Ser. No. 10/038,883.

Figure 3:
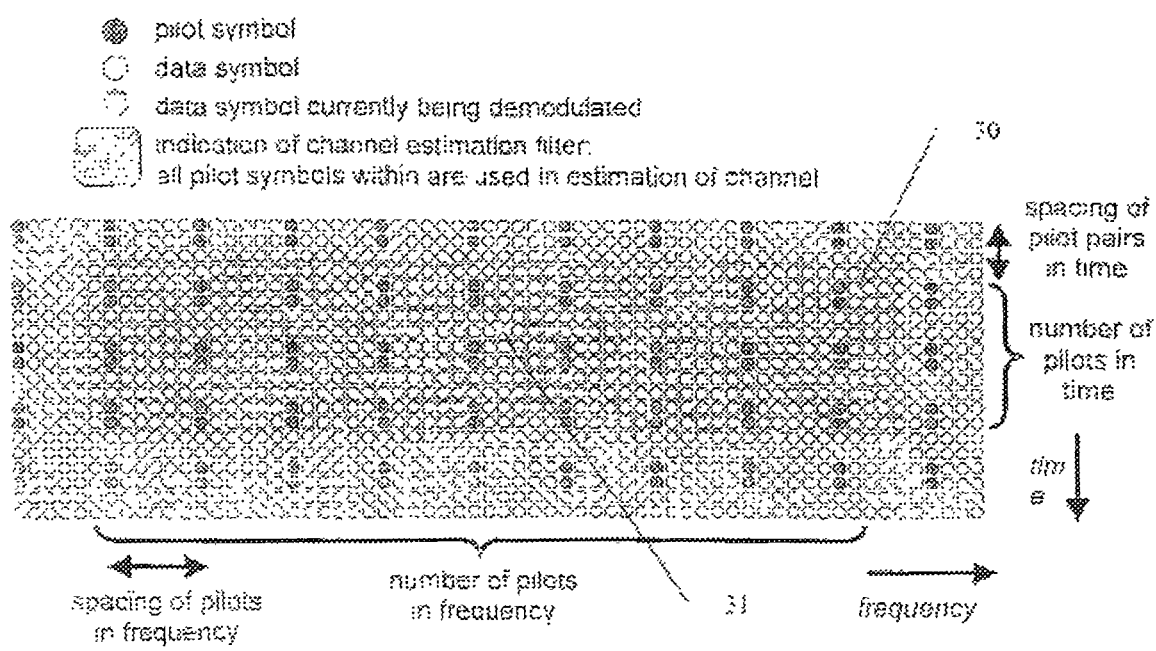
FIG. 3 shows an example of a pilot symbol pattern and channel estimation filter suitable for use in the present invention.

The combined data and pilot MIMO-OFDM transmission is received at the UE 20, and for each of the four receive antennas 21, 22, 23, 24, the known pilot symbols are used to determine the channel responses from the two transmit antennas 11, 12. Thus in the illustrated example, there are eight channels to estimate in total. The use of a single pair of pilot symbols would in general not be sufficient to produce an accurate and reliable estimate of the channel response, owing to the effects of noise and interference. Rather, several pilot symbol pairs surrounding the data symbol currently being demodulated are input into a channel estimation filter, which by averaging across several pilot symbol pairs, reduces the amount of noise and interference whilst maximising the wanted signal energy. An example of this is shown in FIG. 3, wherein the shaded rectangle 30 indicates the extent of the channel estimation filter, and shows which pilot symbols would be used in the estimation process for the data symbol 31 currently being demodulated.

The channel estimates are then used to form the optimum receive beamformer solution, to extract the original two transmitted data layers from the received signals. These can then be demodulated, decoded and multiplexed to produce the reconstructed data stream.

Key aspects of the invention centre around two features of the described system—the channel estimation filter, and the scattered pilot parameters, each of which is described in turn below.

Channel Estimation Filter

As discussed above, the presence of a channel estimation filter is vital to combat the effects of noise and interference, which would otherwise tend to corrupt the channel estimate, reducing the probability of successful data reception. In order to optimise the receiver performance, the number of pilot symbol pairs to include within the filter, in both the frequency and time domains, and the shaping of the filter in terms of the values of the filter coefficients, need to be carefully chosen. However, the optimum setting of these channel estimation filter parameters will be affected by a number of factors, including signal-to-noise-plus-interference ratio (SNIR), and the degree of dispersion and temporal fading.

In a highly dispersive environment, the channel will be changing rapidly in frequency, and so the optimum filter would be shorter in the frequency domain (in FIG. 3, the shaded rectangle 30 would shrink in the horizontal dimension). This is because pilot symbols further away in frequency become less dependent on the current channel response, and so adding them into the channel estimation filter would detract from the accuracy of the channel estimate.

In an environment with little dispersion, the opposite holds true, and it would be advantageous to add in many pilot symbols to the channel estimation filter in the frequency domain. With such samples being still representative of the true channel, the gain against noise and interference is maximised, whilst maintaining the confidence of the channel estimate.

The same argument can be used in the time domain. If the channel is changing rapidly in time, it would be desirable to shorten the channel estimation filter in the vertical direction as shown in FIG. 3, to minimise the possibility of adding in pilot symbols whose channel is very different from that seen by the data symbol it is desired to demodulate. Equally, if the channel is relatively static, there is a gain against noise if many pilot symbols are included within the channel estimation filter.

The SNIR seen by the UE 20 is also of importance in optimising the channel estimation filter. In an environment with a high SNIR, relatively few samples may be required to achieve the desired gain against noise and interference within the channel estimation filter. This brings the advantage of minimising any effects of dispersion or temporal fading. On the other hand, in a low SNIR environment, the channel estimation filter would require a larger number of pilot symbols to average over to achieve the required gain against noise and interference, in order to produce a reliable channel estimate.

Figure 4:
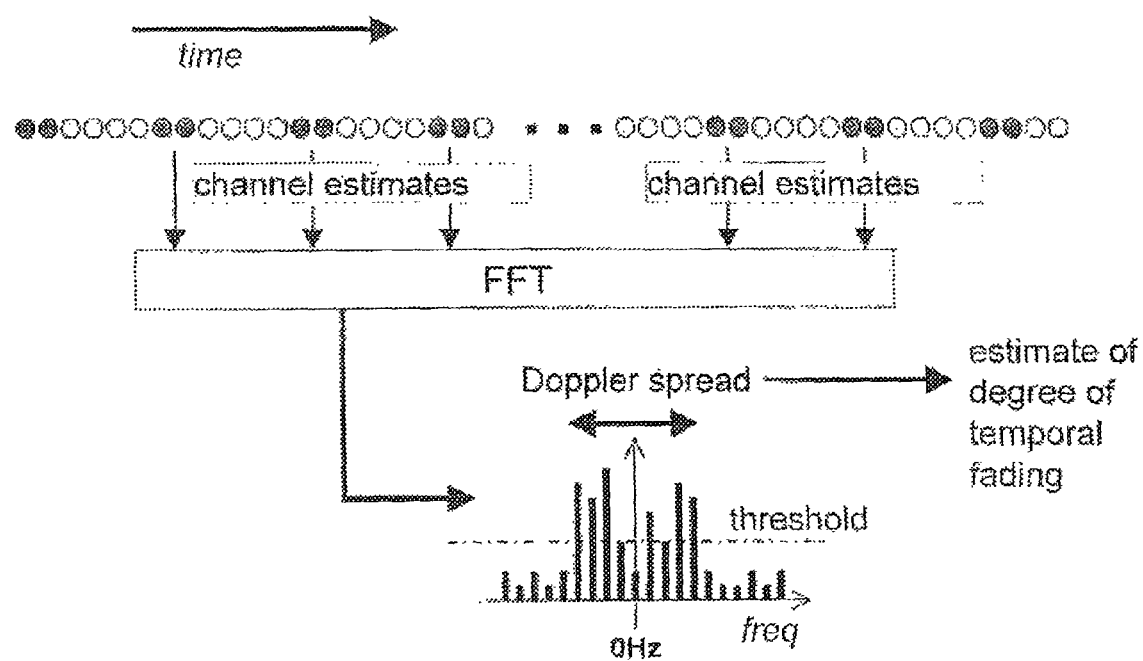
FIG. 4 indicates how a processor estimates the degree of temporal fading (Doppler spread) in the time domain.

FIG. 2 shows how a secondary processor is supplied with the current channel estimates, and also an estimate of the current SNIR. This processor, over a relatively long time period (e.g. hundreds of OFDM frames), assesses the degree to which the channel estimates are varying in both time and frequency. Provided with a succession of channel estimates in time, the processor establishes the Doppler spread of the channel, and maintains a running mean of this quantity, as shown in FIG. 4. This could be done, for example, by carrying out an FFT of a succession of channel samples, and then examining the signal powers in the FFT output bins. By setting some appropriate threshold to exclude (i.e. set to zero) FFT bins which contain only noise and interference, we can estimate the Doppler spread of the received signal as the frequency difference between the highest and lowest significant bin. This is a measure of the Doppler spread, and therefore also a measure of how rapidly the channel is changing. Similar processing can be independently applied using time-evolving samples from different OFDM tone positions across the total signal bandwidth. The results of this independent processing can then be combined in some appropriate way to reduce the effects of noise and thus enhance overall Doppler spread estimation reliability.

Analogous processing could be applied in the frequency domain in order to estimate the delay spread of the channel, and hence gauge how rapidly the channel is changing in frequency. In this case, the outputs of an inverse FFT are examined, in order to indicate the relative powers of different delayed multipath components. This provides a measure of how rapidly the channel is changing from tone-to-tone within a given OFDM symbol.

In the ways described (as possible embodiments above, the processor can gauge the amount of dispersion and the rapidity of temporal fading seen at the UE 20. As the degree of dispersion is related to the multipath environment, and the degree of temporal fading is mainly dependent on the speed of the UE, neither of these factors (dispersion or UE speed) would be expected to change rapidly. These assessments of the degree of dispersion and temporal fading can then be used to alter the channel estimation filter parameters.

Figure 5:
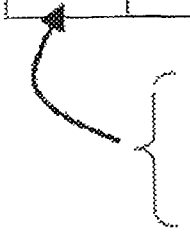
FIG. 5 indicates how the number of options available for channel estimation filter parameters can be limited to a specified set of conditions.

To minimise complexity, the measure of the degree of dispersion, temporal fading and SNIR could be limited to a restricted number of options. For example, the degree of dispersion could be reduced to a simple high/medium/low metric, as shown in FIG. 5. The degree of temporal fading could also be limited to a three-way variable, whilst the SNIR measure could be a single binary digit, labelled low and high. In this way, the number of possible channel estimation filter parameter sets is limited to eighteen, simplifying the design of the receiver.

In terms of the channel estimation filter, the parameter set includes three parameters—the number of pilot symbols to be included in the channel estimation filter in the frequency domain, the number to include in the time domain, and the actual filter coefficients themselves. In the simplest implementation, the coefficients would all be unity, making the channel estimation filter a simple averaging process. In a more complex implementation, the filter may be a Wiener filter, whose output will be the minimum mean-squared error (MMSE) estimate of the channel response.

Scattered Pilot Parameters

In addition to the adaptation of the channel estimation filter, it is proposed that the scattered pilot itself is modified in real time to be optimised in terms of its spectral efficiency. Considering the scattered pilot diagram in FIG. 3, it can be seen that there are two key scattered pilot transmission parameters; the spacing of the pilot symbols in frequency, and the spacing in time. The optimum value for these parameters is governed by the degree of channel dispersion and temporal fading respectively.

In a highly dispersive channel, it is beneficial to have the pilots closely spaced in the frequency domain, to allow the receiver to accurately track the changes of the channel response. However, closer spacing of the pilots reduces the overall spectral efficiency of the downlink, as each pilot symbol substitutes a useful data symbol. Thus in a channel with little frequency selectivity, it is best to widely space the pilots in frequency, to minimise the pilot overhead whilst still enabling accurate channel estimation at the receiver.

The same technique can be used in the time domain, with the pilot symbols being closely spaced in time if the channel is changing rapidly, and widely spaced in time if the channel is relatively static.

In order to select the optimal pilot transmission strategy, the base station needs to be aware of the downlink channel conditions. In the system diagram of FIG. 2, it can be seen that in this implementation, it is the UE which decides on the optimal pilot parameters, according to its current measurement of the degree of dispersion and temporal fading. These parameters are fed back to the base station on an uplink control channel. As discussed above, the rate of change of these parameters will be very slow, due to the slow-changing nature of their underlying physical causes, and so this feedback channel will involve an insignificant overhead on the uplink. This will be particularly true if the range of scattered pilot parameter options is limited to a restricted set of options, as indicated in the matrix in FIG. 5.

An alternative scheme involves the base station making its own direct measurements of channel conditions on the uplink. Whilst the actual channel responses on the uplink will be different from those on the downlink, the degree of dispersion and the speed of temporal fading will be equivalent, and so measuring these parameters at the base station will be valid. The base station would then select an optimised scattered pilot transmission strategy, and indicate this to the UE on a forward control channel.

We claim:

1. A method of inserting pilot symbols into orthogonal frequency division multiplexing (OFDM) frames at an OFDM transmitter having at least one transmitting antenna, each OFDM frame comprising a plurality of OFDM symbols, the method comprising the steps of:

for the or each transmitting antenna, obtaining historical data regarding channel conditions, and inserting scattered pilot symbols in a scattered pattern dependent upon said historical data, wherein said historical data comprises one or more of signal to noise plus interference ratio (SNIR), dispersion and/or temporal fading, and the spacing of the scattered pilot symbols in time and/or frequency is governed by at least one of: the SNIR, dispersion and/or temporal frequency, and wherein the SNIR, dispersion and/or temporal frequency by which the spacing of the pilot symbols is governed is mapped to one element of a table, each element of the table corresponding to a different range of values of SNIR, dispersion and/or temporal frequency and defining a respective spacing of the pilot symbols to be used.

2. The method as claimed in claim 1 wherein said historical data is obtained from a receiver.

3. The method as claimed in claim 1 wherein said historical data is obtained by the antenna by observation of an uplink signal.

4. An OFDM transmitter comprising at least one transmit antenna, capable of receiving historical data regarding channel conditions, and inserting scattered pilot symbols in a scattered pattern dependent upon said historical data, wherein said historical data comprises one or more of signal to noise plus interference ratio (SNIR), dispersion and/or temporal fading, and the spacing of the scattered pilot symbols in time and/or frequency is governed by at least one of: the SNIR, dispersion and/or temporal frequency, and wherein the SNIR, dispersion and/or temporal frequency by which the spacing of the pilot symbols is governed is mapped to one element of a table, each element of the table corresponding to a different range of values of SNIR, dispersion and/or temporal frequency and defining a respective spacing of the pilot symbols to be used.

5. A system or network including the OFDM transmitter as claimed in claim 4.

6. A method of estimating a plurality of channel responses at an orthogonal frequency division multiplexing (OFDM) receiver having at least one receive antenna, the method comprising the steps of:

obtaining historical data regarding channel conditions, selecting a channel estimation filter according to said historical data, wherein said historical data comprises one or more of signal to noise plus interference ratio (SNIR), dispersion and/or temporal fading, and parameters of the selected channel estimation filter are governed by at least one of: the SNIR, dispersion and/or temporal frequency, and wherein the SNIR, dispersion and/or temporal frequency by which the parameters of the selected channel estimation filter are governed is mapped to one element of a table, each element of the table corresponding to a different range of values of SNIR, dispersion and/or temporal frequency and defining respective parameters of the channel estimation filter to be used.

7. An OFDM receiver comprising at least one receive antenna and an adaptive filter, whose size and shape can be selected or varied according to channel conditions including at least one of SNIR, dispersion and/or temporal frequency to optimize channel estimation, and wherein the SNIR, dispersion and/or temporal frequency by which the size and shape of the filter is governed is mapped to one element of a table, each element of the table corresponding to a different range of values of SNIR, dispersion and/or temporal frequency and defining a respective size and shape of the filter to be used.

8. The OFDM receiver as claimed in claim 7 wherein the adaptive filter comprises an infinitely adjustable filter.

9. The OFDM receiver as claimed in claim 7 wherein the adaptive filter comprises a filter selected from a specified set of filters.

10. The system or network including the OFDM receiver as claimed in claim 7.

11. An OFDM signal including pilot symbols, said pilot symbols being arranged in a pattern selected according to historical data regarding channel conditions, wherein said historical data comprises one or more of signal to noise plus interference ratio (SNIR), dispersion and/or temporal fading, and the spacing of the pilot symbols in time and/or frequency is governed by at least one of: the SNIR, dispersion and/or temporal frequency, and wherein the SNIR, dispersion and/or temporal frequency by which the spacing of the pilot symbols is governed is mapped to one element of a table each element of the table corresponding to a different range of values of SNIR, dispersion and/or temporal frequency and defining a respective spacing of the pilot symbols to be used.

12. An adaptive channel estimation filter for use in an OFDM receiver, whose size and shape can be selected or varied to optimize channel estimation, according to historical data regarding channel conditions, wherein said historical data comprises one or more of signal to noise plus interference ratio (SNIR), dispersion and/or temporal fading, and the size and shape of the filter is governed by at least one of: the SNIR, dispersion and/or temporal frequency, and wherein the SNIR, dispersion and/or temporal frequency by which the size and shape of the filter is governed is mapped to one element of a table each element of the table corresponding to a different range of values of SNIR, dispersion and/or temporal frequency and defining a respective size and shape of the filter to be used.

13. Software for controlling an adaptive channel estimation filter as claimed in claim 12.

14. An improved data transmission service in which pilot symbols are inserted in a pattern dependent upon historical data regarding channel conditions, wherein said historical data comprises one or more of signal to noise plus interference ratio (SNIR), dispersion and/or temporal fading, and the spacing of the pilot symbols in time and/or frequency is governed by at least one of: the SNIR, dispersion and/or temporal frequency, and wherein the SNIR, dispersion and/or temporal frequency by which the spacing of the pilot symbols is governed is mapped to one element of a table, each element of the table corresponding to a different range of values of SNIR, dispersion and/or temporal frequency and defining a respective spacing of the pilot symbols to be used.

15. An improved data transmission service including use of an adaptive channel estimation filter whose size and shape can be selected or varied to optimize channel estimation, according to historical data regarding channel conditions, wherein said historical data comprises one or more of signal to noise plus interference ratio (SNIR), dispersion and/or temporal fading, and the size and shape of the filter is governed by at least one of: the SNIR, dispersion and/or temporal frequency, and wherein the SNIR, dispersion and/or temporal frequency by which the size and shape of the filter is governed is mapped to one element of a table, each element of the table corresponding to a different range of values of SNIR, dispersion and/or temporal frequency and defining a respective size and shape of the filter to be used.

16. A method of improving channel estimation in an orthogonal frequency division multiplexing (OFDM) communication system by signalling data between a receiver and a transmitter using a control channel, said data being used to optimize channel estimation and comprising a parameter set for a pilot symbol pattern, wherein the parameter set governs the spacing of the pilot symbols in time and/or frequency, and the spacing of the pilot symbols is governed by at least one of: SNIR, dispersion and/or temporal frequency, and wherein the SNIR, dispersion and/or temporal frequency by which the spacing of the pilot symbols is governed is mapped to one element of a table, each element of the table corresponding to a different range of values of SNIR, dispersion and/or temporal frequency and defining a respective spacing of the pilot symbols to be used.

17. The method as claimed in claim 16 wherein said data is transmitted on the uplink between said receiver and said transmitter.

18. The method as claimed in claim 16 wherein said data is transmitted on the downlink between said transmitter and said receiver.

19. The method as claimed in claim 16 wherein said data comprises a parameter set for an adaptive channel estimation filter.

* * * * *